(12) United States Patent
Monden

(10) Patent No.: US 9,361,517 B2
(45) Date of Patent: Jun. 7, 2016

(54) SYSTEM AND METHOD FOR EXTRACTING REPRESENTATIVE FEATURE

(75) Inventor: Akira Monden, Minato-ku (JP)

(73) Assignee: NEC CORPORATION, Tokyo (JP)

( * ) Notice: Subject to any disclaimer, the term of this patent is extended or adjusted under 35 U.S.C. 154(b) by 545 days.

(21) Appl. No.: 13/381,827

(22) PCT Filed: Jun. 15, 2010

(86) PCT No.: PCT/JP2010/060095
§ 371 (c)(1),
(2), (4) Date: Dec. 30, 2011

(87) PCT Pub. No.: WO2011/001817
PCT Pub. Date: Jan. 6, 2011

(65) Prior Publication Data
US 2012/0106798 A1    May 3, 2012

(30) Foreign Application Priority Data
Jul. 1, 2009  (JP) .................................. 2009-156831

(51) Int. Cl.
*G06K 9/46*   (2006.01)
*G06K 9/00*   (2006.01)
*G06K 9/62*   (2006.01)

(52) U.S. Cl.
CPC .......... *G06K 9/00523* (2013.01); *G06K 9/6215* (2013.01); *G06K 9/6218* (2013.01); *G06K 9/6284* (2013.01)

(58) Field of Classification Search
None
See application file for complete search history.

(56) References Cited

U.S. PATENT DOCUMENTS

| | | | | |
|---|---|---|---|---|
| 5,832,182 A * | 11/1998 | Zhang | ................. | G06F 17/3025 382/226 |
| 5,983,224 A * | 11/1999 | Singh | ................... | G06K 9/6223 |
| 6,647,142 B1 * | 11/2003 | Beardsley | ................ | G06K 7/12 235/381 |
| 6,700,998 B1 * | 3/2004 | Murata | ......................... | 382/117 |
| 6,744,922 B1 * | 6/2004 | Walker | .............. | G06F 17/30787 375/E7.271 |

(Continued)

FOREIGN PATENT DOCUMENTS

| | | |
|---|---|---|
| JP | 06-209469 A | 7/1994 |
| JP | 07-271987 A | 10/1995 |

(Continued)

OTHER PUBLICATIONS

"Chapter 13, Clustering Algorithms I1: Hierarchical Clustering" In: Sergios Theodoridis; Konstantinos Koutroumbas: "Pattern Recognition", 4th edtition, Nov. 2008, Elsevier, Burlington, MA, USA, XP002693919, ISBN: 978-1-59749-272-0, pp. 653-700.*

(Continued)

*Primary Examiner* — Jayesh A Patel
*Assistant Examiner* — Iman K Kholdebarin
(74) *Attorney, Agent, or Firm* — Sughrue Mion, PLLC

(57) ABSTRACT

A representative feature extraction system which selects a representative feature from an input data group includes: occurrence distribution memory means for memorizing an occurrence distribution with respect to feature quantities assumed to be input; evaluation value calculation means for calculating, with respect to each of data items in the data group, the sum of distances to the other data items included in the data group based on the occurrence distribution, to determine an evaluation value for the data item; and data selecting means for selecting the data item having the smallest evaluation value as a representative feature of the data group.

15 Claims, 6 Drawing Sheets

(56) References Cited

U.S. PATENT DOCUMENTS

| | | | | |
|---|---|---|---|---|
| 7,027,643 | B2* | 4/2006 | Comaniciu | G06K 9/42 382/162 |
| 7,216,311 | B2* | 5/2007 | Tanaka et al. | 716/51 |
| 7,653,264 | B2* | 1/2010 | Hero | G06K 9/627 345/619 |
| 7,889,914 | B2* | 2/2011 | Regli | G06N 99/005 382/159 |
| 7,965,867 | B2* | 6/2011 | Lanz | G06K 9/00369 382/103 |
| 7,979,372 | B2* | 7/2011 | Hively | G06N 99/005 706/45 |
| 8,379,983 | B2* | 2/2013 | Hotta | G06K 9/6255 382/185 |
| 8,542,950 | B2* | 9/2013 | Berg | G06F 17/30247 382/220 |
| 8,593,478 | B2* | 11/2013 | O'Brien-Strain | H04N 1/644 345/589 |
| 8,630,490 | B2* | 1/2014 | Denney | G06F 17/30247 382/190 |
| 8,640,015 | B2* | 1/2014 | Ide | G06F 17/30705 382/197 |
| 2003/0036853 | A1* | 2/2003 | Sammak | G01N 15/1475 702/19 |
| 2008/0031492 | A1* | 2/2008 | Lanz | G06K 9/00369 382/103 |
| 2010/0303342 | A1* | 12/2010 | Berg | G06F 17/30247 382/155 |
| 2011/0194767 | A1* | 8/2011 | Kishi | H03M 7/4012 382/168 |
| 2012/0096359 | A1* | 4/2012 | Denney | G06F 17/30247 715/730 |
| 2012/0106798 | A1* | 5/2012 | Monden | G06K 9/00523 382/103 |
| 2012/0140987 | A1* | 6/2012 | Singh | G06K 9/48 382/103 |

FOREIGN PATENT DOCUMENTS

| | | |
|---|---|---|
| JP | 10-149373 A | 6/1998 |
| JP | 11-167634 A | 6/1999 |
| JP | 2002-22419 A | 8/2002 |
| JP | 2004-258750 A | 9/2004 |
| JP | 2005-260588 A | 9/2005 |
| JP | 2007-142883 A | 6/2007 |
| JP | 2008-065803 A | 3/2008 |

OTHER PUBLICATIONS

"Chapter 14: Clustering Algorithms I11: Schemes Based on Function Optimzation" n: Sergios Theodoridis; Konstantinos Koutroumbas: "Pattern Recognition", 4th edtition, Nov. 2008, Elsevier, Burlington, MA, USA, XP002693920, ISBN: 978-1-59749-272-0, pp. 701-763.*

"Excerpts from chapter 15: Clustering Algorithms IV" In: Sergios Theodoridis; Konstantinos Koutroumbas: "Pattern Recogntion", 4th edtition, Nov. 2008, Elsevier, Burlington, MA, USA, XP002693921, ISBN: 978-1-59749-272-0, pp. 803-821,837,852-862.*

Axel Y. Rivera: "A Methodology to Determine the Number of Clusters in Unsupervised Hyperspectral Image Classification",Proceedings of the National Conference on Undergraduate Research (NCUR) 2008, Apr. 10, 2008 , pp. 1-8, XP055056552.*

Yong Shied—Shuo-Jen Hsu et al: "Detecting Clusters and Outliers for Multi-dimensional Data", Multimedia and Ubiquitous Engineering, 2008. MUE 2008. International Conference on, IEEE, Piscataway, N J, USA, Apr. 24, 2008, pp. 429-432, XP031263727, ISBN: 978-0/7695-3134-2.*

Prati A et al: "Using circular statistics for trajectory shape analysis", Computer Vision and Pattern Recognition, 2008. CVPR 2008. IEEE Conference on, IEEE, Piscataway, N J, USA, Jun. 23, 2008, pp. 1-8, XP031297395, ISBN: 978-1-4244-2242-5.*

"Chapter 13, Clustering Algorithms II: Hierarchical Algorithms" In: Sergios Theodoridis; Konstantinos Koutroumbas: "Pattern Recognition", 4th edition, Nov. 2008, Elsevier, Burlington, MA, USA, XP-002693919, pp. 653-700.

"Chapter 14: Clustering Algorithms III: Schemes Based on Function Optimization" In: Sergios Theodoridis; Konstantinos Koutroumbas: "Pattern Recognition", 4th edition, Nov. 2008, Elsevier, Burlington, MA, USA, XP002693920, p. 701-763.

"Excerpts from chapter 15: Clustering Algorithms IV" In: Sergios Theodoridis; Konstantinos Koutroumbas: "Pattern Recognition", 4th edition, Nov. 2008, Elsevier, Burlington, MA, USA, XP002693921, pp. 803-821, 837, 852-862.

Axel Y. Rivera: "A Methodology to Determine the Number of Clusters in Unsupervised Hyperspectral Image Classification", Proceedings of the National Conference on Undergraduate Research (NCUR) 2008, Apr. 10, 2008, pp. 1-8, XP055056552.

Yong Shi, Ed.—Shuo-Jen Hsu Et Al: "Detecting Clusters and Outliers for Multi-dimensional Data" Multimedia and Ubiquitous Engineering, 2008. Mue 2008. International Conference on, IEEE, Piscataway, NJ, USA, Apr. 24, 2008, pp. 429-432, XP031263727.

Prati A. Et Al: "Using Circular statistics for trajectory shape analysis", Computer vision and pattern recognition, 2008. IEEE Conference on, IEEE, Piscataway, NJ, USA, Jun. 23, 2008 pp. 1-8, XP031297395.

Kollios G. Et Al: "An Efficient approximation scheme for data mining tasks", Proceedings 17th International Conference on Data Engineering. (ICDE'2001). Heidelberg, Germany, Apr. 2-6, 2001; [International Conference on Data Engineering. (ICDE)], Los Alamitos, CA : IEEE Comp. Soc, US, Apr. 2, 2001, pp. 453-462, XP010538091.

European Search Report, dated Apr. 3, 2013, issued by the European Patent Office in counterpart European Application No. 10793987.8.

* cited by examiner

SYSTEM AND METHOD FOR EXTRACTING REPRESENTATIVE FEATURE

CROSS REFERENCE TO RELATED APPLICATIONS

This application is a National Stage of International Application No. PCT/JP2010/060095 filed Jun. 15, 2010, claiming priority based on Japanese Patent Application No. 2009-156831, filed Jul. 1, 2009, the contents of all of which are incorporated herein by reference in their entirety.

TECHNICAL FIELD

The present invention relates to a representative feature extraction system and method for extracting, from a data group formed of a plurality of data items, feature data representative of the data group.

BACKGROUND ART

A representative feature extraction technique to extract from a data group formed of a multiplicity of data items a feature representative of the data group is used in the wide fields of image processing, image recognition, data mining, etc. For example, an image can be compressed by extracting from image data a representative feature well representing the characteristics of the whole or a portion of the image and by expressing the image as the representative feature and a difference from the representative feature. The technique can be also applied to sea rescue or the like; a drowning person, a person drifting on the sea, a driftage or the like can be detected by extracting, as a representative feature, pixels representative of the pixel values of the sea surface from an image of the sea surface taken from high above the sea, and by detecting pixels different from the representative feature. Further, technique can also be applied to behavior mining or the like, i.e., analysis of a behavior using a representative feature, which is performed by dividing a continuous behavior pattern into partial patterns so as to form similar behavior patterns and by extracting from the partial patterns features representative of the partial patterns.

In an image processing apparatus described in JP2007-142883A [PL1], as an example of an apparatus performing representative feature extraction, motion vectors are divided into groups similar in motion and an average vector is determined with respect to each group, thereby determining representative vectors representative of the respective groups. In an image region dividing method described in JP11-167634A [PL2], RGB values of pixels of an image are combined to form a histogram, thereby dividing the image into regions similar in color. An average color or a most frequent color is obtained as a representative color with respect to each region. In an image processing apparatus described in JP2008-065803A [PL3], maximum values in a histogram in a color space are selected to obtain representative colors, and expression in the representative colors is performed. In this way, color limiting processing is performed to reduce the number of colors used in an input image.

As a technique relating to the present invention, JP2002-222419A [PL4] discloses a technique to divide an image into regions or clusters. In a moving picture coding apparatus described in JP2005-260588A [PL5], the sum of the absolute values of the differences in the pixel values is obtained on a pixel-by-pixel basis between each frame in an interval and the other frames in the interval to select a representative frame in the interval. The total sum of such sums with respect to all the other frames is defined as a disparity value, and the frame having the smallest disparity value is obtained as a representative frame in the interval. JP6-209469A [PL6] discloses hierarchically performing coding on image data.

SUMMARY OF INVENTION

Technical Problem

In the representative feature extraction techniques in the above-described related art, JP2007-142883A [PL1] and JP11-167634A [PL2] describe a method of determining a representative feature by calculating an average of feature quantities. The technique to extract a representative feature by using an average, however, has a problem in that it is not useful in a case where a feature quantity includes an outlier value. An outlier value is a value largely deviating from an essential value due to the influence of noise or the like. A feature quantity at a large distance from an average largely influences the average. When a feature quantity includes an outlier value, it is not possible to obtain a suitable representative value based on an average of feature quantities.

JP11-167634A [PL2] and JP2008-065803A [PL3] describe a method of determining a representative feature by obtaining the maximum or largest value by means of a histogram. The method using a histogram, however, has a problem in that it is not useful in a case where data is sparse. When data is sparse and there are only a small number of data items taking the same value, a histogram cannot be prepared. In particular, when the number of dimensions of a feature is large, data is relatively sparse. It is usually difficult to prepare a histogram when a feature having a large number of dimensions is used.

Therefore, an exemplary object of the present invention is to provide a representative feature extraction system useful even when an outlier value is included in a feature quantity or when data is sparse.

Another exemplary object of the present invention is to provide a representative feature extraction method useful even when an outlier value is included in a feature quantity or when data is sparse.

Solution to Problem

The representative feature extraction system according to an exemplary aspect of the invention is a representative feature extraction system which selects a representative feature from an input data group, the system including: occurrence distribution memory means that memorizes an occurrence distribution with respect to feature quantities assumed to be input; evaluation value calculation means that calculates, with respect to each of data items in the data group, the sum of distances to the other data items included in the data group based on the occurrence distribution, to determine an evaluation value for the data item; and data selecting means that selects the data item having the smallest evaluation value as a representative feature of the data group.

The representative feature extraction method according to an exemplary aspect of the invention is a representative feature extraction method of selecting a representative feature from input data, the method including: calculating, with respect to each of data items in the data group, the sum of distances to the other data items included in the data group based on an occurrence distribution with respect to feature quantities assumed to be input, and determining an evaluation value for the data item; and selecting the data item having the smallest evaluation value as a representative feature of the data group.

According to the present invention, a representative feature can be selected with stability, for example, even when an outlier value is included in feature quantities. This is because the evaluation value between two data items is the probability of a data item based on a pattern virtually generated from an occurrence distribution of feature quantities in an arbitrary pattern being closer relative to the two data items compared with each other. A data item including an outlier value is remoter than other data items. Accordingly, the probability of a data item based on the pattern being closer than a data item including an outlier value is increased to a value closer to 1. The evaluation by probability 1 is the same as that in the case where the corresponding feature does not exist. Therefore, the influence of the outlier value on the evaluation value for the other data items is small. Also, according to the present invention, a representative feature can be determined even when data is sparse, because a data item having the smallest sum of the distances to other data items can be determined without fail no matter what the number of data items is included in the data group.

DESCRIPTION OF EMBODIMENTS

Exemplary embodiments for implementation of the invention will be described in detail with reference to the drawings.

Figure 1:
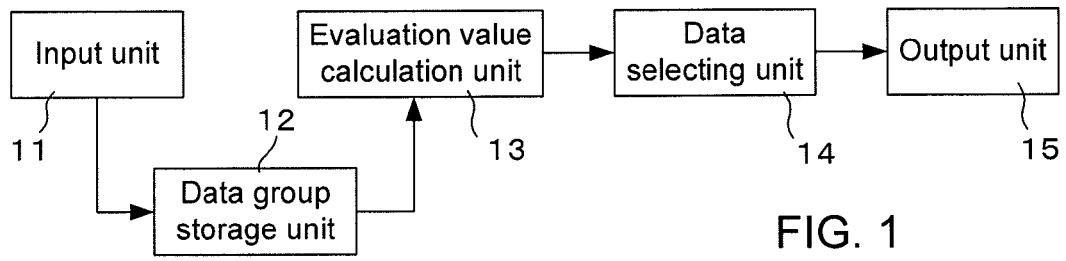
FIG. 1 is a block diagram showing the configuration of a representative feature extraction system according to a first exemplary embodiment.

A representative feature extraction system shown in FIG. 1, which is a first exemplary embodiment, includes: input unit 11 that reads a data group to be processed; data group storage unit 12 that stores the read data group; evaluation value calculation unit 13 that determines an evaluation value with respect to each of data items in the data group stored in data group storage unit 12; data selecting unit 14 that selects, from the data items in the data group stored in data group storage unit 12, as a representative feature of the data group, the data item having the smallest of the evaluation values calculated by evaluation value calculation unit 13; and output unit 16 that outputs the data item selected by data selecting unit 14 as a representative feature of the data group out of the system. Evaluation value calculation unit 13 calculates, with respect to each data item in the data group, distances representing the degrees of similarity to the other data items in the data group, and determines the evaluation value for each data item by using the sum of the distances. Input unit 11, data group storage unit 12, evaluation value calculation unit 13, data selecting unit 14 and output unit 15 respectively function as input means, storage means, evaluation value calculation means, data selecting means and output means.

Figure 2:
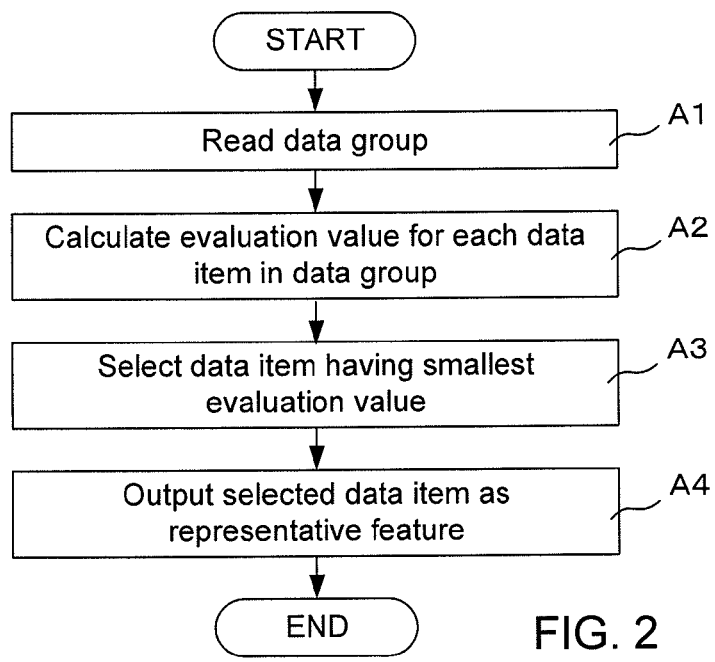
FIG. 2 is a flowchart showing the operation of the system shown in FIG. 1.

Description will be made of the flowchart of FIG. 2 with respect to the operation of the representative feature extraction system shown in FIG. 1.

First, in step A1, input unit 11 reads a data group to be processed and stores it in data group storage unit 12. Next, in step A2, evaluation value calculation unit 13 calculates, with respect to each of data items in the data group in data group storage unit 12, distances representing the degrees of similarity to the other data items in the data group, and determines the evaluation value for each data item by using the sum of the distances. Thereafter, in step A3, data selecting unit 14 selects, from the data items in the data group stored in data group storage unit 12, as a representative feature of the data group, the data item having the smallest of the evaluation values obtained in step A2. In step A4, output unit 15 outputs the data item selected in step A3 as a representative feature. As described later, the evaluation value is determined, for example, so as to be smaller if the sum of the distances from the other data items is smaller. As a result, the data item having the smaller sum of the distances, i.e., the higher degree of similarity to the other data items in the data group, is selected as a representative feature.

The representative feature extraction system in the first exemplary embodiment can be realized by using a computer such as a personal computer or a workstation and by executing a program on the computer. To the computer, a camera or the like is connected as input unit 11 and a display or the like is connected as output unit 15. The computer generally includes: a central processing unit (CPU); a hard disk drive storing programs and data; a main memory, an input device such as a keyboard or a mouse for inputting commands or the like; a reader reading a recording medium such as a CD-ROM; an interface used for connection to an external network; and the like. Data group storage unit 12 is configured by allocating a memory area on the main memory or the hard disk drive. A computer program for realizing the functions of the above-described evaluation value calculation unit 13 and data selecting unit 14 is read to and executed by the computer to realize the representative feature extraction system according to the first exemplary embodiment by the computer. The program is read from a recording medium such as a CD-ROM or via a network to the computer.

Next, a representative feature extraction system according to a second exemplary embodiment will be described. The second exemplary embodiment is characterized in that: data is hierarchically divided into a plurality of partial data groups; a data item having such distances from the other data items in each partial data group that the sum of its distances is the smallest of the sums of the distances between the data items is determined as a representative of the partial data group; and a representative feature is selected by hierarchically executing processing for selecting such representative data.

Figure 3:
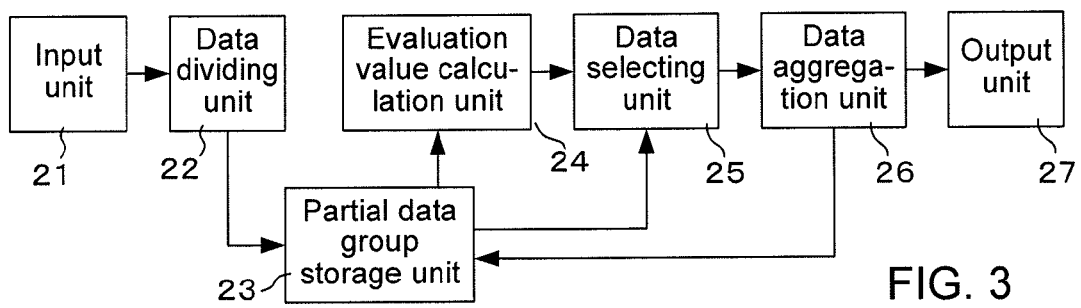
FIG. 3 is a block diagram showing the configuration of a representative feature extraction system according to a second exemplary embodiment.

The representative feature extraction system in the second exemplary embodiment shown in FIG. 3 includes: input unit 21 that reads data to be processed, i.e., input data; data dividing unit 22 that hierarchically divides the input data into a plurality of partial data groups; partial data group storage unit 23 that stores the partial data groups in each class in the hierarchy; evaluation value calculation unit 24 that determines an evaluation value with respect to each of data items in each partial data group in each class in the hierarchy; data selecting unit 25 that selects representative data from each partial data group in each class in the hierarchy; data aggregation unit 26 that aggregates the data selected by data selecting unit 25; and output unit 27 that outputs out of the system the data determined as a representative feature with respect to the input data by data aggregation unit 26. Evaluation value calculation unit 24 calculates, with respect to each of data items in each partial data group which is in the hierarchy class to be processed and is stored in partial data group storage unit 23, distances representing the degrees of similarity to the other data items in the partial data group, and determines an evaluation value for each data item by using the sum of the distances. Data selecting unit 25 selects, from data items in each partial data group which is in the hierarch class to be processed and is stored in the partial data group storage unit 23, as representative data from the partial data group, the data item having the smallest of the evaluation values calculated by evaluation value calculation unit 24. If the representative data selected by data selecting unit 25 is from the highest class in the hierarchy, data aggregation unit 26 determines the representative data as a representative feature with respect to the input data. If the representative data selected by data selecting unit 25 is from one of the classes in the hierarchy other than the highest class, data aggregation unit 26 produces partial data groups in a class one rank higher than that class in the hierarchy and stores the produced partial data groups in partial data group storage unit 23.

In this configuration, input unit 21, data dividing unit 21, partial data group storage unit 23, evaluation value calculation unit 24, data selecting unit 25, data aggregation unit 26 and output unit 27 respectively function as input means, dividing means, storage means, evaluation value calculation means, data selecting means, aggregation means and output means.

Description will be made of the flowchart of FIG. 4 with respect to the operation of the representative feature extraction system shown in FIG. 3.

First, in step B1, input unit 11 reads data to be processed, i.e., input data. In step B2, data dividing unit 22 hierarchically divides the input data into a plurality of partial data groups and stores the partial data groups in partial data group storage unit 23. In step B3, in processing on the lowest class in the hierarchy to be processed in the plurality of classes in the hierarchy not processed yet at the present point in time, evaluation value calculation unit 24 calculates, with respect to each data item in each partial data group which is in the class to be processed and is stored in partial data group storage unit 23, distances representing the degrees of similarity to the other data items in the partial data group, and determines an evaluation value for each data item by using the sum of the distances. The classes not processed yet, referred to here, are classes on which evaluation value calculation and data selecting processing described below are not completed at the present point in time. Thereafter, in step B4, data selecting unit 25 selects, with respect to each partial data group which is in the hierarchy class to be processed at the present point in time and stored in partial data group storage unit 23, as representative data from the partial data group, the data item having the smallest of the evaluation values obtained in step B3. In step B5, data aggregation unit 26 determines whether or not the class presently processed is the highest class in the hierarchy. In the case of determining in step B5 that the class presently processed is the highest class in the hierarchy, data aggregation unit 26 determines as a representative feature to the input data the representative data from the processed hierarchy class. In step B7, output unit 27 outputs the representative feature out of the system. On the other hand, in the case of determining in step B5 that the class presently processed is not the highest class in the hierarchy, in step B6, data aggregation unit 26 produces partial data groups belonging to the class one rank higher than the hierarchy class presently processed by aggregating the representative data from the partial data groups in the class presently processed, and stores the produced partial data groups in partial data group storage unit 23. Thereafter, processing from step B3 is repeated to repeat the above-described processing on the class one rank higher than the class presently processed. The object to be processed in the next evaluation value calculation by evaluation value calculation unit 24 is the partial data groups in the class one rank higher, produced by data aggregation unit 26.

Thus, in the second exemplary embodiment, data dividing unit 22 that hierarchically divides input data into a plurality of partial data groups, partial data group storage unit 23 that stores the partial data groups in each class in the hierarchy, and data aggregation unit 26 that puts together representative data from the partial data groups in each class in the hierarchy to prepare partial data groups in the next class are provided to enable evaluation value calculation and data selection for representative data to be hierarchically performed. Evaluation value calculation unit 24 and data selecting unit 25 perform the same processings on each partial data group as those performed by evaluation value calculation unit 13 and data selecting unit 14 in the first exemplary embodiment to select representative data for each partial data group.

In the second exemplary embodiment thus arranged, the total amount of calculation can be reduced by performing evaluation value calculation on each of partial data groups in a hierarchy. Also, data including outlier values can be removed at the stage of processing on a lower one of the classes in the hierarchy, so that the influence of outlier values can be reduced and a representative feature can be selected with stability.

The representative feature extraction system in the second exemplary embodiment can be realized by executing a program on a computer, as is that in the first exemplary embodiment. In the case of realizing the representative feature extraction system in such a way, partial data group storage unit 23 can be configured by allocating a memory area on a main memory of a computer or on a hard disk drive. The program executed on the computer is a program for realizing the functions of the above-described data dividing unit 22, evaluation value calculation unit 24, data selecting unit 25 and data aggregation unit 26.

Next, a representative feature extraction system according to a third exemplary embodiment will be described. In the representative feature extraction system according to the third exemplary embodiment shown in FIG. 5, occurrence distribution memory unit 16 is provided in the system according to the first exemplary embodiment shown in FIG. 1. Occurrence distribution memory unit 16 memorizes an occurrence distribution of feature quantities assumed to be input. The occurrence distribution of feature quantities is supplied from occurrence distribution memory unit 16 to evaluation value calculation unit 13. Occurrence distribution memory unit 16 functions as occurrence distribution memory means.

In the present exemplary embodiment, evaluation value calculation unit 13 calculates an evaluation value by using an occurrence distribution of feature quantities assumed to be input. The "occurrence distribution of feature quantities assumed to be input" refers to a distribution of values which data items in a data group supplied to input unit 12 are expected to have. More specifically, with respect to each data item in a data group, distances representing the degrees of similarity to the other data items in the data group are calculated and the evaluation value for each data item is determined by using the sum of the distances, as in the case of the first exemplary embodiment. It is assumed with respect to this processing that when data is virtually generated based on the occurrence distribution memorized in occurrence distribution memory unit 16, the distance value between two data items is expressed by the probability of the virtually generated data coming between the two data items presently compared. In other words, it is assumed that when a pattern is virtually generated from the occurrence distribution of feature quantities, the distance from data item A in a data group to another data item B in the data group is the probability that the pattern which is closer than data item B relative to data item A is observed. Then, evaluation value calculation unit 13 directly sets as an evaluation value this distance value or the sum of the distance values. Alternatively, evaluation value calculation unit 13 determines an evaluation value from the distance value by using such a suitable function as will set a higher evaluation value when the distance value is increased.

Description will be made of the flowchart of FIG. 6 with respect to the operation of the representative feature extraction system shown in FIG. 5.

First, in step A 1, input unit 11 reads a data group to be processed and stores it in data group storage unit 12. Next, in step Ata, evaluation value calculation unit 13 calculates, with respect to each of data items in the data group in data group storage unit 12, a distance value representing the degrees of similarity to the other data items in the data group by using the occurrence distribution memorized in occurrence distribution memory unit 16, as descried above, and determines the evaluation value for each data item by using the sum of the distances. Thereafter, in step A3, data selecting unit 14 selects, from the data items in the data group stored in data group storage unit 12, as a representative feature of the data group, the data item having the smallest of the evaluation values obtained in step A2. In step A4, output unit 15 outputs the data item selected in step A3 as a representative feature.

In the third exemplary embodiment as described above, because of consideration of an occurrence distribution of feature quantities, the probability of a pattern virtually generated from the occurrence distribution being closer to a certain data item relative to data including an outlier value is higher and closes to 1. That is, data including an outlier value is remoter than other data when seen from the certain data item. According to the essential meaning of the occurrence distribution of feature quantity, the evaluation by probability 1 is the same as that in the case where the corresponding feature does not exist. The influence of the outlier value on the evaluation value for the other data items is small. Thus, even in a case where feature quantities of data include an outlier value, processing according to the present exemplary embodiment enables performing more suitable representative feature extraction.

The representative feature extraction system in the third exemplary embodiment can be realized by executing a program on a computer, as is that in the first exemplary embodiment. In this case, data group storage unit 12 and occurrence distribution memory unit 16 are configured by allocating a memory area on a main memory of a computer or on a hard disk drive.

Next, a representative feature extraction system according to a fourth exemplary embodiment will be described. In the representative feature extraction system according to the fourth exemplary embodiment shown in FIG. 7, clustering unit 28 and cluster representative extraction unit 29 are added to the system according to the second exemplary embodiment shown in FIG. 3. Clustering unit 28 and cluster representative extraction unit 29 respectively function as clustering means and cluster representative extraction means. Clustering unit 28 is provided on the output side of data aggregation unit 26. Clustering unit 28 divides selected representative features of partial data groups into a plurality of clusters with resemblances in characteristics. Cluster representative extraction unit 29 extracts, from the clusters divided by clustering unit 28, representative features representative of the clusters and sends the extracted representative features to output unit 29. As a result, output unit 29 outputs the representative features representative of the clusters as representative feature of the input data.

Figure 7:
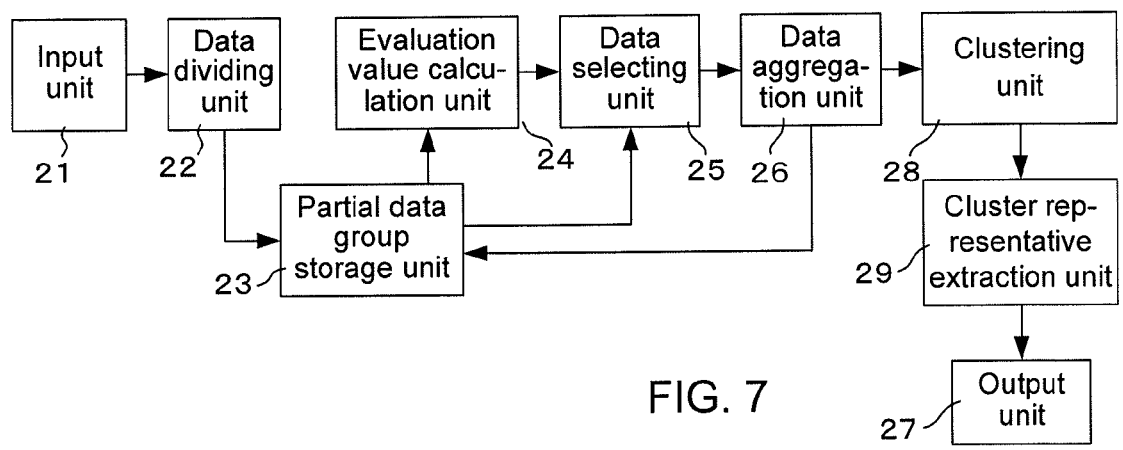
FIG. 7 is a block diagram showing the configuration of a representative feature extraction system according to a fourth exemplary embodiment.
Figure 8:
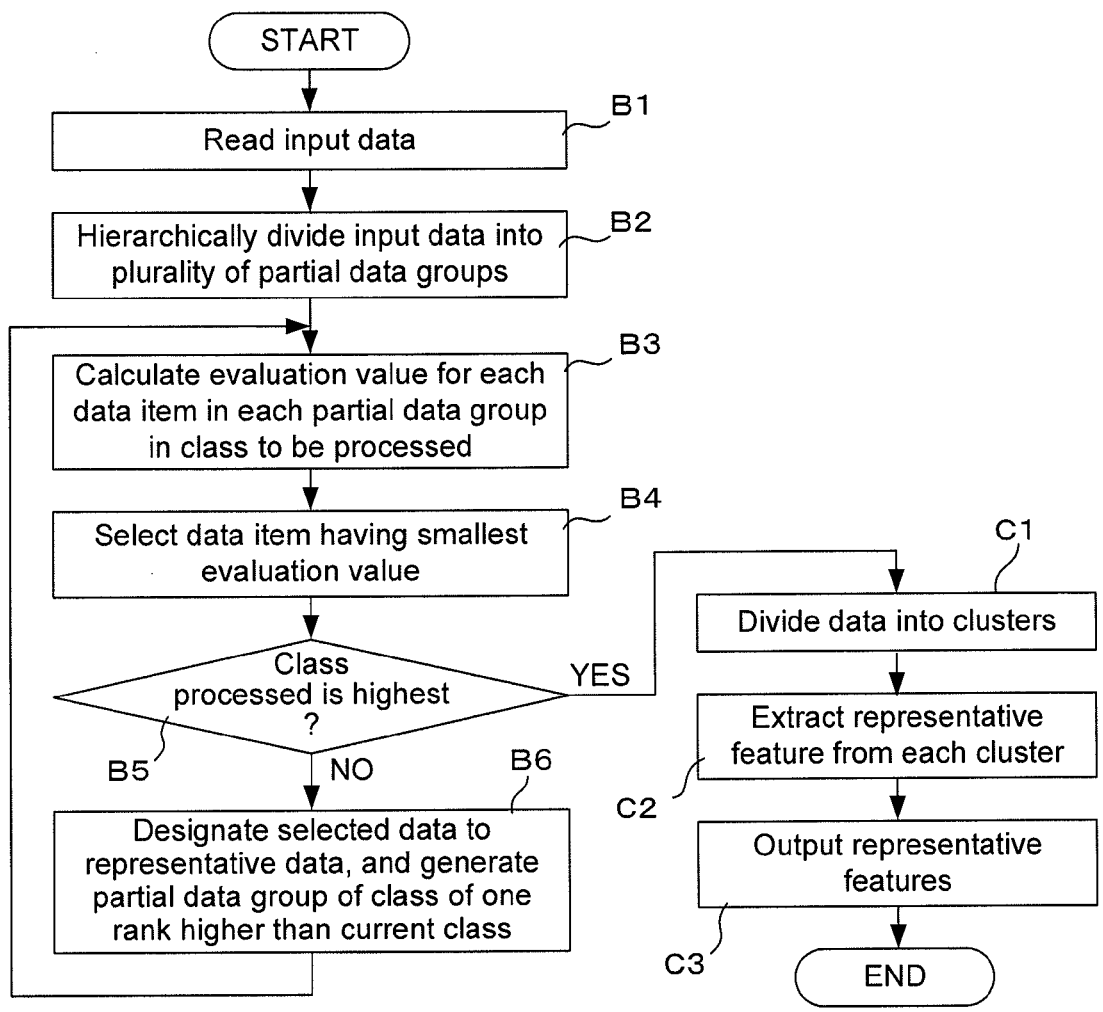
FIG. 8 is a flowchart showing the operation of the system shown in FIG. 7.

Description will be made of the flowchart of FIG. 8 with respect to the operation of the representative feature extraction system shown in FIG. 7.

Figure 4:
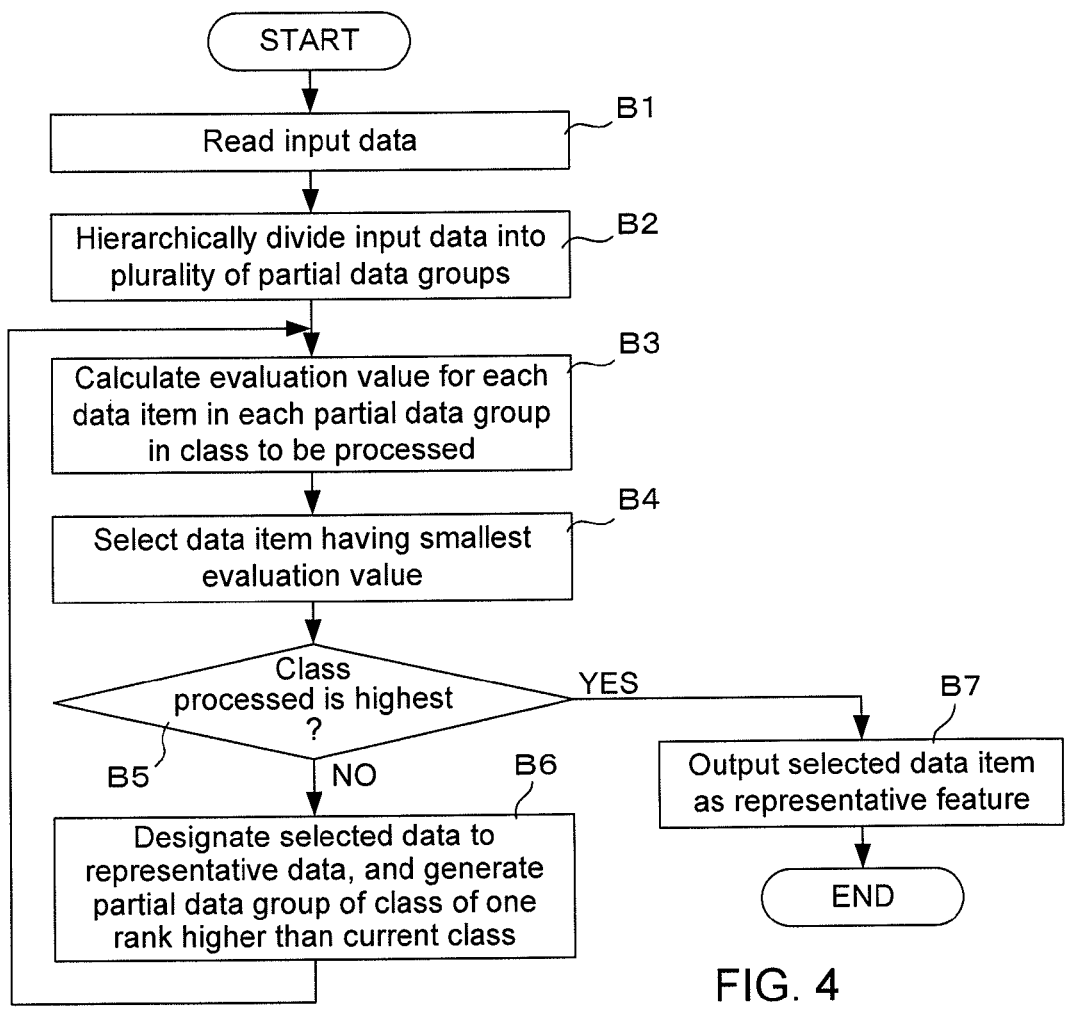
FIG. 4 is a flowchart showing the operation of the system shown in FIG. 3.

Processing from step B1 to step B6 is executed in the same way as that shown in FIG. 4. After execution of step B5, if the class in the hierarchy at the present point in time is the highest class, clustering unit 28 classifies (i.e., clusters) data supplied to clustering unit 28 into clusters with resemblances in feature quantities in step C1. In step C2, cluster representative extraction unit 29 extracts a representative feature from each of the clusters formed by clustering unit 28. Thereafter, in step C3, output unit 27 outputs out of the system the representative features extracted in step C2.

In the fourth exemplary embodiment thus arranged, use of the clustering method enables, in a case where input data is formed of data groups having a plurality of characteristics, selection of a representative feature corresponding to each data group.

The representative feature extraction system in the fourth exemplary embodiment can be realized by executing a program on a computer, as is that in the first exemplary embodiment. In the case of realizing the representative feature extraction system in such a way, partial data group storage unit 23 is configured by allocating a memory area on a main memory of a computer or on a hard disk drive. The program executed on the computer is a program for realizing the functions of the above-described data dividing unit 22, evaluation value calculation unit 24, data selecting unit 25, data aggregation unit 26, clustering unit 28 and cluster representative extraction unit 29.

Figure 9:
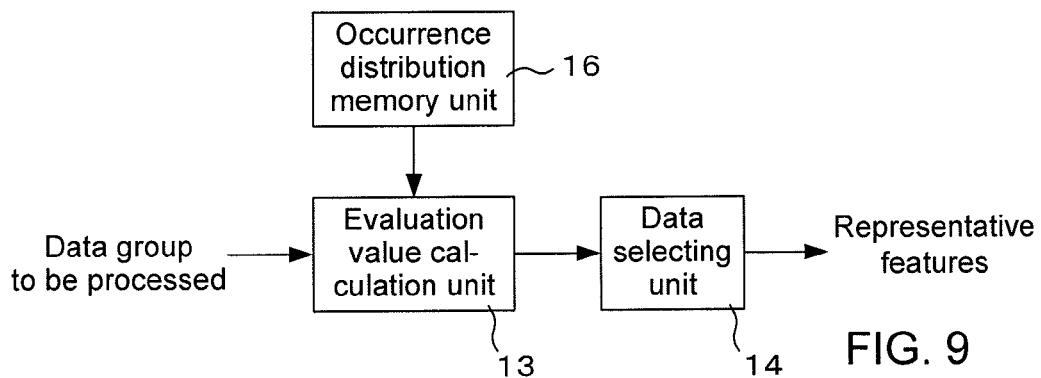
FIG. 9 is a block diagram showing the configuration of a representative feature extraction system according to a further exemplary embodiment.

FIG. 9 is a block diagram showing the configuration of a representative feature extraction system according to a further exemplary embodiment.

Figure 5:
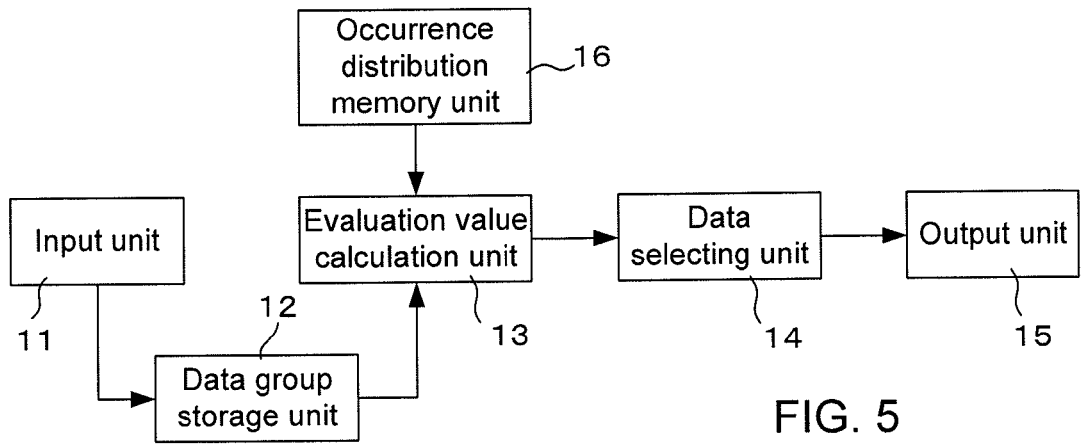
FIG. 5 is a block diagram showing the configuration of a representative feature extraction system according to a third exemplary embodiment.
Figure 6:
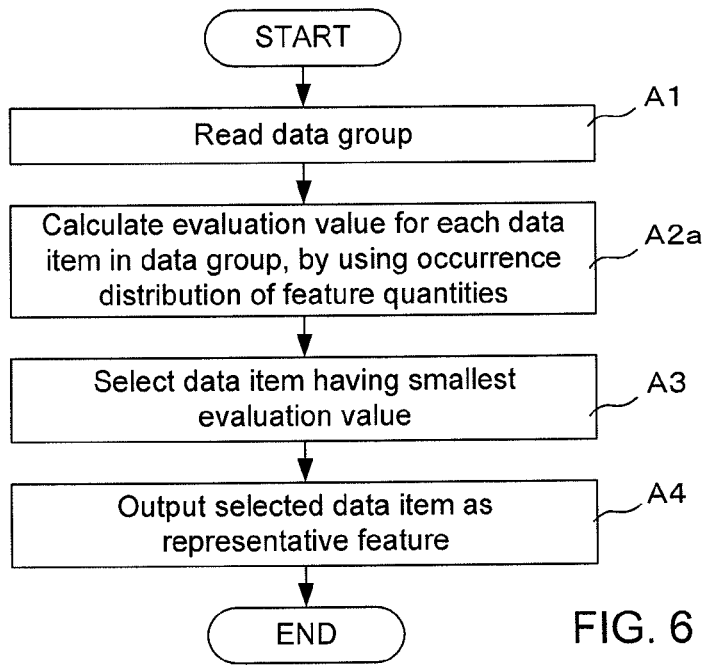
FIG. 6 is a flowchart showing the operation of the system shown in FIG. 5.

The representative feature extraction system shown in FIG. 9 is similar to the representative feature extraction system in the third exemplary embodiment shown in FIG. 5, but differs from the system shown in FIG. 5 in that input unit 11, data group storage unit 12 and output unit 15 are not provided. That is, this configuration includes: occurrence distribution memory unit 16 that memorizes an occurrence distribution of feature quantities assumed to be input; evaluation value calculation unit 13 that calculates, with respect to each of data items in a data group, the sum of distances to the other data items in the data group based on the occurrence distribution and thereby determines an evaluation value for the data item; and data selecting unit 14 that selects the data item having the smallest evaluation value as a representative feature of the data group. For example, when a pattern is virtually generated according to the occurrence distribution memorized in the occurrence distribution memory unit 16, evaluation value calculation unit 13 determines the distance between two data items as a value according to the probability of a data value based on the pattern existing between the values of the two data items in each of components in the feature quantities. Also with this configuration, extraction of a representative feature is performed by the same procedures as that in the third exemplary embodiment.

The representative feature extraction system in the exemplary embodiment shown in FIG. 9 can be realized by executing on a computer a program for realizing the functions of the above-described evaluation value calculation unit 13 and data selecting unit 24, as is each of the systems in the first to fourth exemplary embodiments.

Thus, each of the representative feature extraction systems in the above-described exemplary embodiments can be realized by executing a program on a computer. Such a program is, for example, a program for making a computer execute processing for determining an evaluation value for each of data items in an input data group by calculating the sum of distances to other data items in the data group based on an occurrence distribution of feature quantities assumed to be input, and processing for selecting the data item having the smallest evaluation value as a representative feature of the data group. It is possible to configure the program so that, in processing for determining the evaluation value, the distance between two data items is determined, for example, as a value according to the probability of a data value based on a pattern virtually generated according to the occurrence distribution existing between the values of the two data items in each of components in the feature quantities. Thus, the above-described computer program and a computer-readable recording medium on which the computer program is stored are also included in the scope of the exemplary embodiments.

EXAMPLES

The operation of the above-described exemplary embodiments will be described by using concrete Examples.

Example 1

Example 1 corresponds to the above-described second exemplary embodiment. Example 1 is an application of the second exemplary embodiment to a sea rescue system for finding a person who needs rescue, e.g., a drowning person or a person drifting on the sea by extracting a feature representing the very surface of the sea from an image of the sea surface taken with a hyper-spectral camera, and by detecting pixels corresponding to the person, a driftage and the like other than the sea surface. More specifically, the representative feature extraction system in the second exemplary embodiment is used in extracting a feature representing data on the sea surface.

The hyper-spectral camera is a camera having the function of finely measuring the spectrum of an object with high wavelength resolution and capable of measuring the spectral intensity, for example, over several tens to several hundreds of bands with bandwidths of several nanometers to several tens of nanometers with respect to each pixel. If the number of bands is D, information on each pixel can be expressed as data in the form of a D-dimensional vector formed of D number of spectral intensities. If the number of pixels of an image is N, information on the entire image can be expressed as a group of N number of data items, i.e., a data array, in the form of D-dimensional vectors.

Figure 10:
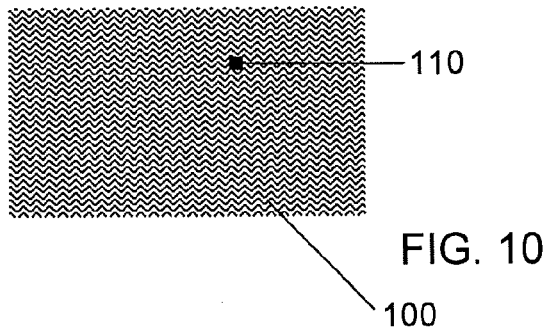
FIG. 10 is a view showing an example of an input image.

In the present Example, K number of representative features well representing the overall features are extracted from N number of data strings, while data differing in characteristics from the K number of representative features is detected as abnormal data. In this way, pixels not corresponding to the sea surface are extracted from a taken image of the sea surface to detect a person who needs rescue, e.g., a person drifting on the sea. For example, in a case shown in FIG. 10, person 110 drifting on sea 100 appears on a region of sea 100 occupying the almost entire area of an image to be processed, feature vectors for the sea surface occupying the almost entire area of the image are used as reference data and person 110 drifting on the sea is detected by finding pixels different from the reference vectors, thus assisting a rescue activity.

In the present Example, the hyper-spectral camera is used as input unit 21; a display is used as output unit 27; and data dividing unit 22, evaluation value calculation unit 24, data selecting unit 25 and data aggregation unit 26 are realized in a software manner by executing a program on a computer. As partial data group storage unit 23, a memory device in the computer is used.

Information on an image is supplied from the hyper-spectral camera used as input unit 21. The image is two-dimensional. $I_i$ represents information on each pixel i of the image, and $G=\{I_1, I_2, \ldots, I_N\}$ represents the set of the entire input data. As information on each pixel, spectral intensities are assumed to be feature quantities and is expressed, as a D-dimensional vector consisting of D number of feature quantities: $I_i=(v_i^{(1)}, v_i^{(2)}, \ldots, v_i^{(D)})$.

Figure 11:
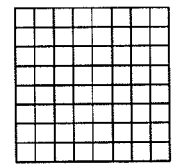
FIG. 11 is a view showing an example of a dividing method.
Figure 12:
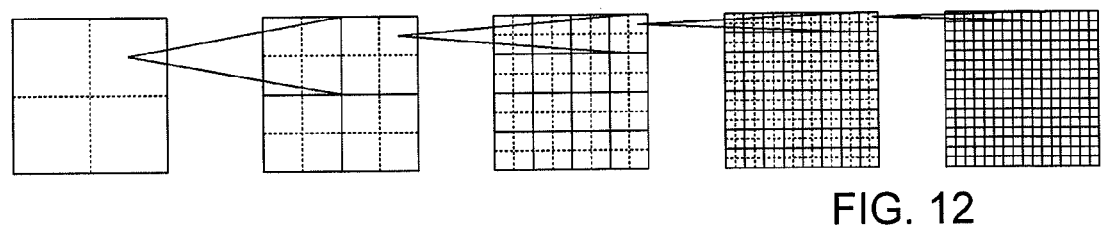
FIG. 12 is a view showing an example of a hierarchical structure.

Data dividing unit 22 divides input data $G=\{I_i\}$ into a plurality of partial data groups. In the division of the input data to the partial data groups is performed in a manner that the input data is divided into a two-dimensional lattice configuration such as shown in FIG. 11, thereby forming a hierarchical structure such as shown in FIG. 12. This is for forming one partial data group for regions spatially close to each other, because regions spatially close to each other are thought to have spectral characteristics close to each other.

For example, in a case where an image having 256×256 pixels (65536 data items) is an input image; the number k of representative features to be output is 1; and division to form a hierarchical structure is performed so that one data item in each class in the hierarchy is formed by data in a 2×2 pixel region in the class one rank lower, hierarchical division into eight classes:

$$G = (G_1^{(1)}, G_2^{(1)}, G_3^{(1)}, G_4^{(1)})$$

$$G_i^{(1)} = (G_{i,1}^{(2)}, G_{i,2}^{(2)}, G_{i,3}^{(2)}, G_{i,4}^{(2)})$$

$$G_{i,j}^{(2)} = (G_{i,j,1}^{(3)}, G_{i,j,2}^{(3)}, G_{i,j,3}^{(3)}, G_{i,j,4}^{(3)})$$

...

$$G_{i,\ldots,k}^{(7)} = (G_{i,\ldots,k,1}^{(8)}, G_{i,\ldots,k,2}^{(8)}, G_{i,\ldots,k,3}^{(8)}, G_{i,\ldots,k,4}^{(8)})$$

can be made since $256=2^8$. Each class can be divided into partial data groups having 2×2 elements. After the completion of this division, these partial data groups are stored in partial data group storage unit 23.

Next, in processing on the lowest class in the hierarchy to be processed in the plurality of classes in the hierarchy not processed yet at the present point in time, evaluation value calculation unit 24 takes the partial data groups in the class to be processed out of partial data group storage unit 23 and calculates, with respect to each data item in each partial data group taken out, distances to the other data items in the partial data group. Processing on the partial data groups is performed on a class-by-class basis. At the beginning, however, evaluation value calculation unit 24 executes processing for evaluation value calculation on the partial data groups belonging to the lowest class delivered from data dividing unit 22 via partial data group storage unit 23.

For a distance between pixel $I_a$ and pixel $I_b$, any distance criterion such as $L_2$ distance shown by Equation (1) or $L_1$ distance shown by Equation (2) can be used. $L_2$ distance is a generally used distance and is based on the definition of distance in a two-dimensional Euclidean space.

$$L_2(I_a, I_b) = \sum_{j=1}^{D} \left( v_a^{(j)} - v_b^{(j)} \right)^2, \tag{1}$$

$$L_1(I_a, I_b) = \sum_{j=1}^{D} \left| v_a^{(j)} - v_b^{(j)} \right|. \tag{2}$$

Evaluation value calculation unit 24 determines an evaluation value for each data item in each partial data group as the sum of the distances to the other data items in the partial data group. For example, in a case where the partial data group is formed of four data items $\{(I_i, I_j, I_k, I_l)\}$, if the distance between $I_a$ and $I_b$ is represented by $D_{ab}$, an evaluation value $V_i$ for $I_i$ is obtained by $$V_i = +D_{ij} + D_{ik} + D_{il} \tag{3}.$$

Similarly, each of $V_j$, $V_k$ and $V_l$ is determined as the sum of the distances to the other data items.

After the evaluation value has been calculated with respect to each data item in each partial data group in the class to be processed, data selecting unit 25 selects the data item having the smallest evaluation value from the data items in each partial data group. For example, if one partial data group is formed of four data items $\{(I_i, I_j, I_k, I_l)\}$; the evaluation values for the data items are $\{(V_i, V_j, V_k, V_l)\}$; and the smallest of $\{(V_i, V_j, V_k, V_l)\}$ is $V_i$, data selecting unit 25 selects $I_i$ as data representative of this partial data group.

After representative data has been selected with respect to each partial data group in the class to be processed, data aggregation unit 26 determines whether or not the class presently processed is the predetermined highest class. If the class presently processed is the highest class, data aggregation unit 26 notifies output unit 27 of the representative data from the class. If the class presently processed is not the highest class, data aggregation unit 26 prepares partial data groups with respect to the class one rank higher than the class presently processed. The partial data groups in the upper class are formed of a collection of some of the representative data items belonging to the class presently processed and selected by data selecting unit 25. After preparing the partial data groups in the upper class, data aggregation unit 26 supplies the prepared partial data groups to evaluation value calculation unit 24 by storing the prepared partial data groups in partial data group storage unit 22.

For example, in a case where an image having 256×256 pixels (65536 data items) is an input image; the number k of representative features to be output is 1, division of the input data to form a hierarchical structure is performed so that one data item in each class in the hierarchy is formed by data in a 2×2 pixel region in the class one rank lower, 16384 (=128× 128) partial data groups each formed of 2×2 elements exist in the lowest class. With respect to the second lowest class, 4096 (=64×64) partial data groups are prepared based on the 128× 128 representative data items in the lowest class. This processing is performed on the eight classes. As a result, one representative data item is selected from the 2×2 partial data groups in the highest class. One representative data item according to the purpose is obtained from the highest class. Data aggregation unit 26 finally notifies output unit 27 of this representative data item.

The display provided as output unit 27 displays the representative data.

In this Example 1, evaluation value calculation unit 24 calculates, as an evaluation value for each data item, the sum of the distances from the other data items in a partial data group, and data selecting unit 25 selects, for each partial data group, the data item having the smallest evaluation value in the partial data group. Therefore, in contrast with the method of determining a representative value by obtaining a histogram, representative data can be determined with reliability even when the number of dimensions of a feature is large in comparison with the number of data items.

In the case of determining representative data by obtaining a histogram, representative data cannot be correctly determined unless there is such an amount of data that a sufficiently large number of data items come in one interval in the histogram. For example, if the number of data items is so small that the number of data items coming in one interval is one or two, an interval in which two data items happen to exist can be selected as representative data, even though it does not represent the whole. This becomes marked if the number of dimensions of the feature is increased, because the number of intervals increases in proportion to the power of the number of dimensions. When one feature is divided into 100 intervals, 100 intervals result if the feature is one-dimensional, and $100^{60}$ ($=10^{120}$) intervals result if the feature is 60-dimensional.

In contrast with the method using a histogram, the method in Example 1 enables determining representative data without fail even if the number of dimensions of a feature quantity is large.

Also, in the present Example, the process in which evaluation value calculation unit 24 calculates, as an evaluation value for each data item, the sum of the distances to the other data items in the partial data group, and in which data selecting unit 25 selects from each partial data group the data item having the smallest evaluation value in the partial data group is hierarchically performed. Therefore, a representative feature can be extracted with stability even if the data includes an outlier value.

In contrast, in the case of recognizing an average value as a representative feature, the influence of an outlier value is included in the average value. In ordinary cases, when a mean value is calculated, the influence of an object at a remote distance is large due to the very characteristic of the operation to obtain the mean value. There is, therefore, a problem that the influence of an outlier value is inevitably large.

Figure 13:
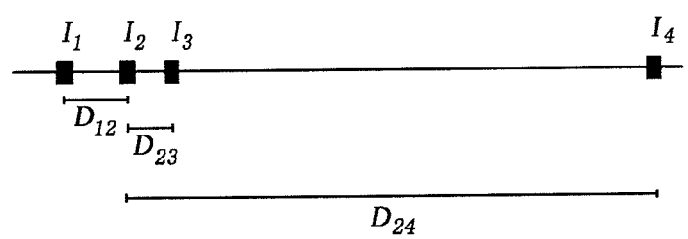
FIG. 13 is a view showing an example of an object to be processed.

With respect to the present Example, it is assumed that, for example, as shown in FIG. 13, a partial data group in the lowest class is formed of four data items $\{(I_1, I_2, I_3, I_4)\}$ and $I_4$ includes an outlier value due to the influence of noise. $D_{ij}$ represents the distance between the data items. Since $I_4$ includes an outlier value, each of distances $D_{14}$, $D_{24}$, and $D_{34}$ is larger than any of distances $D_{12}$, $D_{13}$, and $D_{23}$. Therefore, $V_4$ in the evaluation values $(V_1, V_2, V_3, V_4)$ for the data items each of which is the sum of the distances from one of the data items to the other data items is larger than the other evaluation values $(V_1, V_2, V_3)$. Since the data item having the smaller evaluation value is selected as representative data, data $I_4$ is not selected as representative data in this case. Thus, according to the present Example, the possibility of a data item including an outlier value propagating as representative value to the upper classes is extremely low. Such selection is hierarchically performed, thereby avoiding inclusion in the upper classes of data including an outlier value under the influence of noise or the like, and enabling extracting a representative feature with stability, according to Example 1.

Further, the present Example has the effect of being immune not only to the influence of outlier values due to noise or the like but also to the influence of a very small number of data items differing in characteristics. For example, in a case where the very spectrum of the surface of the sea is extracted as a representative feature in order to find a person drifting on the sea from an image obtained by taking the sea surface, simple averaging results in taking as a representative feature an average of data including data on objects including the person drifting on the sea other than the very surface of the sea as well as data on the sea surface. In the present Example, data is hierarchically selected and data items differing in characteristics in the lower classes are excluded, thus enabling a representative feature to be finally selected without including data differing in characteristics.

The present Example further has the effect of enabling selecting a representative feature at a high speed.

For example, input data includes N number of data items where N=a×b. If all the distances from each data item to the other data items are determined without hierarchically dividing the data, calculating the distance ab(ab−1)/2 times is required.

On the other hand, a case that n number of data items, where n=a×b, are divided into the number a of partial data groups each of which includes the number b of data items in one class in a hierarchy is considered. The number of times the distance is calculated with respect to the number b of data items in each partial data group is b(b−1)/2. This process of calculation is executed on each of the number a of partial data groups. Therefore the total number of times the distance is calculated with respect to the first class is ab(b−1)/2. The number of times the distance is calculated with respect to the second class, i.e., between the number a of data items, is a(a−1)/2. Thus, calculating the distance ab(b−1)/2+a(a−1) times suffices because of the hierarchization of the data. The difference in the number of times the distance is calculated between the case where hierarchization is not performed and the case where hierarchization is performed is a(b²−1)(a−1). Since a and b are larger than 1, the amount of calculation is infallibly reduced by the hierarchization. While the amount of calculation in the case of division into one class in a hierarchy has been shown, a higher calculation amount reduction effect can be achieved if division into a plurality of classes in a hierarchy is made.

In Example 1 described above, the number K of representative features to be finally obtained is assumed to be 1 and one feature is to represent the whole. However, K may be set to a number larger than 1 and a certain number or a multiplicity of representative features may be extracted. For example, representative features may be respectively selected from divided regions of an image each formed of 4×4 pixels to form a compressed image reduced to 1/16 of the original image. In a case where input data is assumed to be formed of a plurality of elements differing in characteristics from each other, it is preferable to obtain a plurality of representative features to respectively represent the plurality of elements differing in characteristics rather than to have one feature represent the whole.

While division of the two-dimensional space into a continuous square lattice configuration for the purpose of obtaining partial data groups has been described, the two-dimensional space may alternatively be divided hierarchically by using any other configuration such as a rectangular lattice, a triangular lattice or a hexagonal lattice. Also, two-dimensional space may alternatively be divided spatially discontinuously, for example, by making division at intervals corresponding to a predetermined number of pixels.

In the present Example, divisions are made without omission and duplication. However, divisions may alternatively be made by permitting occurrence of omission or duplication. Even in a case where some of data items are omitted and not all the data items are utilized or in a case where duplication occurs, a feature of the whole can be obtained. For example, since division into a power of 2 ordinarily facilitates implementation in a computer, fractions may not be included if the number of input data items is not a power of 2. Similarly, if a certain degree of uniformity of input data can be assumed, the influence of duplication, if any, is not considerable.

In Example 1 described above, a hyper-spectral camera is used as input means and image data is directly supplied from this camera to the computer. However, the camera and the computer may be disposed in different locations connected via a network. For example, the arrangement may be such that the camera is mounted on an airplane; data from the camera is transmitted to a control station on the ground via a wireless network; and representative feature extraction is performed by a computer in the ground control station. Also, the arrangement may be such that an image at a site is directly input from the camera to a computer to be processed in real time or is saved in a storage device, and data sampling and representative feature extraction are performed at different times, as in the case of post investigation after the occurrence of a problem.

As an output method of the representative feature, a method of electronically notifying an external device of a representative feature via a network, a method of recording a representative feature on a recording medium such as a hard disk drive or a USB (Universal Serial Bus) memory or any other method may be used as well as the method of showing a representative feature on the display described in the present Example.

The present Example has been described with respect to a case where the representative feature extraction system is used for a system for detecting a person drifting on the sea or a driftage from an image of the sea surface. However, the present Example can also be applied in a similar way to a system for extracting a feature representative of earth and sand for the purpose of detecting an object different from earth and sand from an image of the scene of a sediment disaster and to a system for extracting a feature representative of a desert for the purpose of detecting an oasis from an image of the desert. As data on which processing for representative feature extraction is performed, any data can be used as well as spectral data from the hyper-spectral camera used in the present Example. For example, the present Example can be applied to a fault detection system or the like in which behaviors are expressed by using a plurality of feature quantities, such as a moving speed and stay time, representing the behaviors; representative behaviors are extracted from a history of a series of behaviors; and an abnormal behavior is detected by comparison with the representative behaviors to detect the occurrence of a fault or the like. Further, the present Example can be applied to crime detection or the like in such a manner that voice in speaking of a word is expressed as a multidimensional vector; speeches observed in ordinary conversations are detected as representative features from a series of conversations; and a conversation different from the representative features is detected. Furthermore, the present Example can be applied not only to representative feature selection for abnormality detection by detecting non-normal data but also to selection of representative pixels well representing a feature of an image for the purpose of compressing the image. The present Example can also be applied to classification of data using representative features.

Example 2

Example 2 corresponds to the above-described fourth exemplary embodiment. This Example 2 is similar to Example 1 but differs from Example 1 in that clustering section 28 and cluster representative extraction unit 29 are provided as shown in FIG. 7. Also, assuming that input data is formed of a plurality of elements differing in characteristics, the number of representative features to be finally obtained is set to a plurality. Also, the number K of representative data items is set to 2 or greater.

Figure 14:
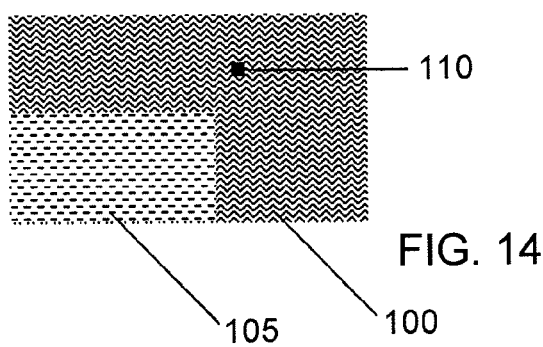
FIG. 14 is a view showing an example of an object to be processed.
Figure 15:
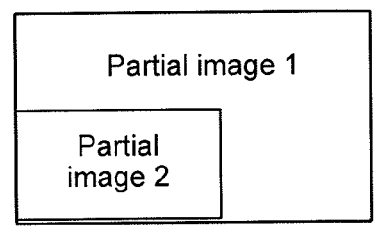
FIG. 15 is a view showing an example of a result of clustering.

If representative data is selected, for example, from each of divided regions of an image each formed of 8×8 pixels, data supplied to clustering unit 28 by performing the same processing as that in Example 1 is representative data (i.e., compressed image) formed by compressing the input image to 1/64. Clustering unit 28 divides the image supplied thereto into partial images (i.e., clusters) with resemblances in feature quantities. For example, if, as shown in FIG. 14, the image to be processed is formed of a region of sea 100 and a region of sand beach 105, clustering unit 28 performs clustering processing on the entire input image to divide the input image into two partial images 1 and 2 corresponding to the region of sea 100 and the region of sand beach 105, as shown in FIG. 15. For clustering processing, any method, e.g., a k-means method can be used.

In FIG. 15, person 110 drifting on the sea is shown in the region of sea 100.

When such clusters are formed, cluster representative extraction unit 29 extracts representative features respectively from the prepared clusters. For example, when two clusters (partial images 1 and 2) representing the region of sea 100 and the region of sand beach 105 are prepared as shown in FIG. 15, cluster representative extraction unit 29 obtains a representative value of the cluster representing the sea and a representative value of the cluster representing the sand beach, as indicated by spectral curves in FIG. 16.

As a method for obtaining representative values of clusters, there is a method of selecting as a representative value a data item having the smallest sum of the distances to other data items, as in the case of processing in evaluation value calculation unit 24 and data selecting unit 25. Representative values of data in clusters may alternatively be obtained as average values of the data in the clusters. In the present Example, representative features are hierarchically selected before clustering is performed, and outlier value data and a small amount of data differing in characteristics are thereby removed in advance. Also, the data is divided into clusters with resemblances in characteristics. Therefore, only data items having substantially the same characteristics exist in one cluster and the results of averaging at this stage are not influenced by any outlier values or data differing in characteristics.

Figure 16:
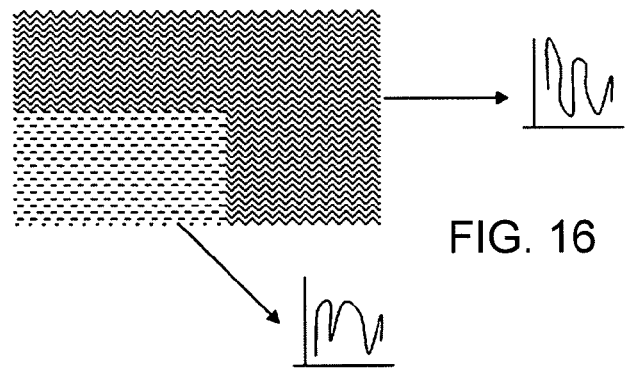
FIG. 16 is a view showing an example of a representative data for each partial image.

For clustering, a method of making division into regions with resemblances by using spatial continuity or a method of making division into regions with resemblances according to spectral similarity only without using spatial continuity may be used. In a case where an input image is formed of a plurality of spatially discriminable regions as shown in FIG. 16, division into regions with resemblances using spatial continuity enables selection of more preferable representative features. In a case where an image in which earth is partially seen in a forest is the input image, clustering of trees of the forest and earth in the input image can be performed by paying attention only to spectral similarity without using spatial continuity.

In Example 2 as described above, an input image is divided into clusters with resemblances in feature quantities and representative feature extraction is performed on each cluster, thus enabling suitable processing even in a case that an input image is formed of a plurality of regions with a certain number of different characteristics. Since hierarchical selection is performed before clustering in Example 2, the input image can be processed at a high speed. Directly performing clustering on input data without performing hierarchical selection is also conceivable. However, a clustering algorithm such as the k-means method requires a considerably long processing time because of use of repetitive calculation. Therefore, hierarchical selection is performed in advance to reduce the number of data items to be clustered, thus achieving a remarkable increase in speed.

Example 3

Example 3 corresponds to the third exemplary embodiment described above with reference to FIG. 5.

Occurrence distribution memory unit 16 memorizes distribution $Qx = (q^{(1)}(x), q^{(2)}(x), q^{(D)}(x))$ of occurrences of data $I_i$, i.e., distribution $q^{(j)}(x)$ of occurrences of each feature quantity $v_i^{(j)}$. For example, information that a distribution of a $j^{th}$ component feature quantity is a normal distribution having average $m^{(j)}$ and variance $\sigma^{(j)}$ or a uniform distribution with respect to an interval $[\min^{(j)}, \max^{(j)}]$ is stored in occurrence distribution memory unit 16. Feature quantity $v_i^{(j)}$ is assumed to occur according to the distribution stored in occurrence distribution memory unit 16. An occurrence distribution including parameters such as an average and a variance may be given in advance based on prior knowledge about the object to be picture taken, or an occurrence distribution may be given by obtaining parameters such as an average and a variance from data actually input while assuming that only the profile of the distribution is known. Further, if no prior knowledge about an occurrence distribution can be obtained, or if an occurrence distribution cannot be determined from any prior knowledge, a uniform distribution is assumed and the maximum $\max^{(j)}$ and the minimum $\min^{(j)}$ of the uniform distribution can be determined from the maximum and the minimum of the $j^{th}$ component of the entire image data actually input.

Evaluation value calculation unit 13 defines the distance between data items $I_a$ and $I_b$ as probability $P(I_a, I_b)$ of a value virtually generated by using occurrence distribution $Q(x)$ memorized in occurrence distribution memory unit 16 being a value between data items $I_a$ and $I_b$. Since the distribution of occurrences of the $j^{th}$ component is $q^{(j)}(x)$, probability $p(v_a^{(j)}, I_b^{(j)})$ of the $j^{th}$ component value of a pattern virtually generated from the occurrence distribution being a value between the value $v_a^{(j)}$ of the $j^{th}$ component of data $I_a$ and the value $v_b^{(j)}$ of the $j^{th}$ component of data $I_b$ is shown by Equation (4). Accordingly, probability $P(I_a, I_b)$ of the virtually generated value being a value between $I_a$ and $I_b$ is shown by Equation (5) if the distributions of occurrences of the components are independent. In ordinary cases, it can be said that if the value of the distance between two data items is increased, the two data items differ from each other to a larger extent, and, if the value of the distance is reduced, the two data items are closer to each other. Also, when the value of the probability defined by Equation (5) is smaller, an event in which a value between the two values is taken seldom occurs, that is, the distance between the two data items is small and the two data items are similar to each other. Conversely, when the probability value is larger, the occurrence of an event in which a value between the two values is taken is not so low, that is, the distance between the two data items is long and the two data items are not similar to each other.

$$p(v_a^{(j)}, v_b^{(j)}) = |\int_{v_a^{(j)}}^{v_b^{(j)}} dx q^{(j)}(x)| \quad (4)$$

$$p(v_a^{(j)}, v_b^{(j)}) = \left| \int_{v_a^{(j)}}^{v_b^{(j)}} dx q^{(j)}(x) \right|, \quad (4)$$

$$P(I_a, I_b) = \prod_{j=1}^{D} p(v_a^{(j)}, v_b^{(j)}). \quad (5)$$

Calculation such as shown by Equation (6) is enabled by taking the logarithm of this probability p as distance $D(I_i, I_R)$ between $I_i$ and $I_R$. Since the logarithmic function (log) is a monotonously increasing function, the characteristic in terms of distance is not changed even when the logarithm is taken.

$$D(I_i, I_R) = \sum_{j=1}^{D} \{\log(p(v_i^{(j)}, v_R^{(j)}))\}. \quad (6)$$

Figure 17:
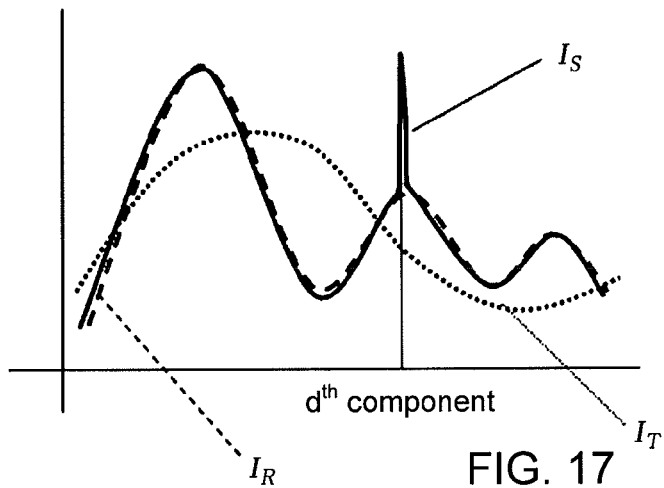
FIG. 17 is a diagram showing an example of an object to be processed.

The advantageous effect of using the distance defined in the present Example in comparison with the case of using the ordinary distance shown by Equation (1) will be described with reference to FIG. 17.

A case will be described where, for example, as a result of occurrence of a loss in the sensor corresponding the $d^{th}$ component or an outlier value taken under the influence of noise, the difference $(v_i^{(d)} - v_R^{(d)})$ of the $d^{th}$ component between $I_i$ and $I_R$ is increased to a large value, though data items $I_i$ and $I_R$ are essentially similar to each other. In FIG. 17, the abscissa represents the $n^{th}$ component and the ordinate represents the value of a feature quantity in the $n^{th}$ component. Data items $I_S$ and $I_R$ are data on a common object, but data item $I_S$ has a feature quantity $v_S^{(d)}$ as an outlier value due to mixing of noise in the $d^{th}$ component of $I_S$. Data items $I_T$ and $I_R$ are data on different objects and data item $I_T$ has feature quantities generally different from those of $I_R$. In the case where ordinary distance $L_2$ is used, however, $(v_S^{(d)} - v_R^{(d)})^2$ is markedly large because $v_S^{(d)}$ is an outlier value. Distance $L_2(I_S, I_R)$ is large, while the feature quantities in the components other than $d^{th}$ components are approximately equal to each other. As a result, data items $I_S$ and $I_R$ are determined as being not similar to each other. On the other hand, $I_T$ and $I_R$ somewhat differ from each other as a whole. However, there are no substantially large differences between the components of $I_T$ and $I_R$ and distance $L_2(I_T, I_R)$ is not so large. As a result, $I_T$ and $I_R$ are determined as being similar to each other than $I_S$ and $I_R$.

The contribution of the $d^{th}$ component in the case of the distance shown by Equation (6) used in the present Example will be considered. When the difference between $v_S^{(d)}$ and $v_R^{(d)}$ becomes large due to an outlier value, $p(v_S^{(d)}, v_R^{(d)})$ is close to 1 and the logarithmic value $\log(p(v_S^{(d)}, v_R^{(d)}))$ of the $d^{th}$ component in Equation (6) is close to 0. Therefore the contribution of the $d^{th}$ component including the outlier value to the whole is small. With respect to the $i^{th}$ component ($i \neq d$) including no outlier value other than the $d^{th}$ component, the difference between $v_S^{(i)}$ and $v_R^{(i)}$ is small; $p(v_S^{(i)}, v_R^{(i)})$ is close to 0; and the logarithmic value $\log(p(v_S^{(i)}, v_R^{(i)}))$ of the $i^{th}$ component in Equation (6) is small (a negative value whose absolute value is large). Since the $d^{th}$ component including the outlier value is 0, and since the component including no outlier value is a negative value whose absolute value is large, the sum $D(I_S, I_R)$ of these values is a negative value whose absolute value is large. This is a small value for the distance defined in the present Example. As a result, data items $I_S$ and $I_R$ are determined as being similar to each other. On the other hand, $I_T$ and $I_R$ differ from each other as a whole and, therefore, $p(v_T^{(i)}, v_R^{(i)})$ has a value close to 1 with respect to all the components, and the logarithmic value $\log(p(v_T^{(i)}, v_R^{(i)}))$ of each component in Equation (6) is close to 0. The result of addition of the values each close to 0 is also close to 0. Therefore $D(I_T, I_R)$ has a value close to 0. The maximum of the distance shown by Equation (6) is 0. Therefore the distance between data items $I_T$ and $I_R$ has a large value.

Because of the characteristic that the distance shown by Equation (6) has, immunity to a loss or an outlier value, if any, in part of feature quantities is given. Therefore the technique according to Example 3 has such characteristics as to enable representative features to be extracted with stability even when an outlier value is included in input data.

Similarly, because of the characteristic that the distance shown by Equation (6) has and that resides in reducing the contribution of a component differing largely to the whole, the technique according to the present Example has such characteristics as to enable representative features to be extracted with stability even when the number of dimensions of a feature is large.

In contrast, in the case of using the ordinary distance $L_2$ shown by Equation (1), a representative feature cannot be extracted with stability if the number of dimensions of the feature is increased. In general, it is said that in the case of using the ordinary distance $L_2$ instability of determination of proximity of data is caused when the number of dimensions is increased. The cause of instability of determination of proximity by means of the ordinary distance when the number of dimensions is large resides in that on the ordinary distance scale, with respect to D assumed to be a large natural number, the contribution of a component at a small distance is much smaller than the contribution of another component at a large distance in components in a D-dimensional pattern. The influence of a minute change of a component such as an outlier value at a large distance is much larger than the contribution of a component at a small distance, thus causing instability of proximity determination. Also, as the number of dimensions D is increased, the probability of occurrence of a component at a large distance becomes higher. Thus, the probability of occurrence of such instability of proximity determination becomes higher in a high-dimensional pattern.

In contrast, in a case where a pattern is virtually generated from an occurrence distribution of feature quantities in an arbitrary pattern as in the present Example, the probability, with respect to each data item, of the pattern coming closer to the normal data item relative to the feature quantity of each data item is closer to 1 with respect to a component having a large difference in feature quantity. Since the influence is reduced with approach to 1, the influence of the component having a large difference in feature quantity on the other components is reduced. Therefore, if the other components are similar to each other, the distance between the two patterns is reduced. Thus, according to the method in the present Example, distance instability can be avoided even when the number of dimensions is increased.

The advantageous effects in a case where a feature can be represented by a high-dimensional vector formed of a plurality of feature quantities and where an outlier value is included in one of the plurality of feature quantities have been shown. The advantageous effects of the present Example in a case where abnormal data is included in one of a plurality of data items will next be described.

As shown in FIG. 13, in a case where a representative value is selected from four data items $\{(I_1, I_2, I_3, I_4)\}$, $I_4$ is assumed to be a data item including an outlier value due to the influence of noise. $D_{ij}$ represents the distance between the data items. Since $I_4$ is a data item including an outlier value, each of the distances $D_{14}$, $D_{24}$, and $D_{34}$ is larger than any of the distances $D_{12}$, $D_{13}$, and $D_{23}$.

As described above, the influence of a remote one is large in the case where the ordinary distance $L_2$ is used. Therefore, considering the sum of the distances, for example, from $I_2$ to the other data items, $D_{24}$ is much larger than $D_{12}$, or $D_{23}$ and the influence of $D_{24}$ is reduced, while the influences of $D_{12}$ and $D_{23}$ are increased. Therefore, an evaluation value is determined based on the positional relationship between $I_1$, $I_2$, and $I_3$ that exist densely, thus selecting a representative feature well representing the characteristics of the data by excluding the outlier value.

Example 4

Figure 18:
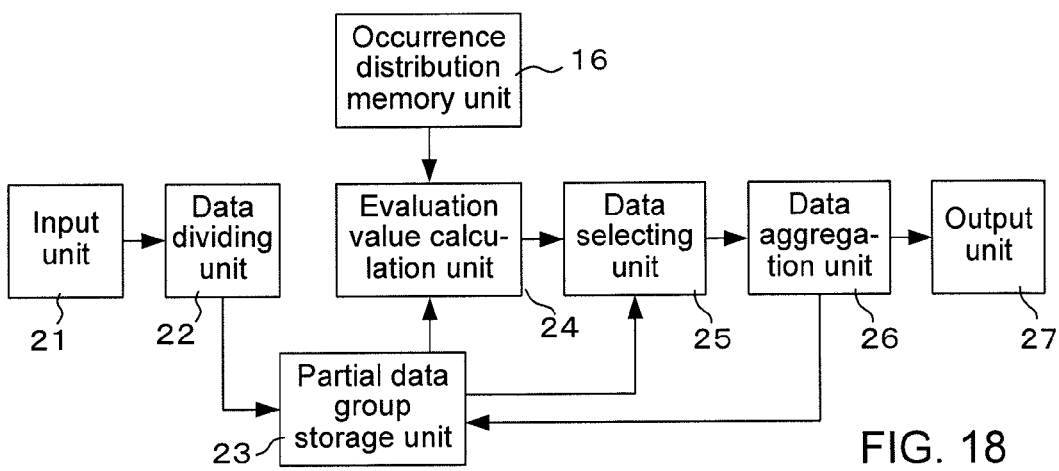
FIG. 18 is a block diagram showing the configuration of a representative feature extraction system in Example 4.

Example 4 will be described. Example 4 is similar to Example 1 but differs from Example 1 in that occurrence distribution memory unit 16 shown in Example 3 is further provided and the distance is calculated and an evaluation value is determined in evaluation value calculation unit 24 by the same procedures as that in evaluation value calculation unit 13 in Example 3. FIG. 18 shows the configuration of the representative feature extraction system in Example 4.

Occurrence distribution memory unit 16 memorizes an occurrence distribution of feature quantities assumed to be input. Input data is divided into partial data groups in a plurality of classes in a hierarchy to be hierarchically processed, as in the case of Example 1. That is, data dividing unit 22 hierarchically divides the input data into a plurality of partial data groups to enable evaluation value calculation and data selection to be hierarchically performed. Evaluation value calculation unit 24 and data selecting unit 25 calculate, with respect to each of data items in each partial data group in each class in the hierarchy, distances representing the degrees of similarity to the other data items in the partial data group, and determines an evaluation value for each data item by using the distances. When a pattern is virtually generated from the occurrence distribution memorized in occurrence distribution memory unit 16, the distance here is the probability of a value in the pattern coinciding with a value between the values of the two data items to be compared with each other. Data aggregation unit 26 collects representative data from the partial data groups and prepares, based on the representative data, partial data groups in the next class in the hierarchy, thus enabling evaluation value calculation and data selection to be hierarchically performed.

Example 4 thus arranged has a combination of hierarchical representative feature selection based on Example 1 and evaluation value calculation based on the occurrence distribution based on Example 3 and, therefore, has the advantageous effects of these two Examples.

More specifically, in the present Example, the hierarchical structure is used and the influence of a small number of data items including outlier values or differing in characteristics is not propagated from a lower class in the hierarchy to a higher class. Therefore, a representative feature can be extracted without being influenced by a small number of data items including outlier values or differing in characteristics, as in the case of Example 1. While the hierarchical structure is used, the probability of a pattern virtually generated from an occurrence distribution taking a value between the values of the two data items presently compared with each other is used, thereby improving immunity to the influence of a small number of data items including outlier values or differing in characteristics, as in the case of Example 3.

Hierarchical calculation and determination of a representative feature by the total sum of the distances enable determination of a representative feature even when the number of data items is small, and also enable speedily determining representative feature, as in the case of Example 1.

The probability of a pattern virtually generated from an occurrence distribution taking a value between the values of the two data items presently compared with each other is used to enable determining a representative feature with stability even when the number of dimensions in a feature is increased, as in the case of Example 3.

In Example 4, a clustering unit and a cluster representative extraction unit can be added, as in the case of Example 2. If these units are added, a representative feature can be extracted with stability even when the input image is formed of a plurality of regions having different characteristics.

INDUSTRIAL APPLICABILITY

The present invention can be applied, for example, to a technical field of performing abnormality detection, data compression, classification, etc., by extracting representative features from an image, speech, a spectral pattern, a behavior pattern, etc.

The present invention has been described with reference to the exemplary embodiments and examples. However, the present invention is not limited to the above-described exemplary embodiments and examples. Various changes understandable by those skilled in the art can be made in the configuration and details according to the present invention within the scope of the invention.

This application is based upon and claims the benefit of priority from Japanese patent Application No. 2009-156831, filed on Jul. 1, 2009, the disclosure of which is incorporated herein in its entirely by reference.

REFERENCE SIGNS LIST 11, 21 Input unit
12 Data group storage unit
13, 24 Evaluation value calculation unit
14, 25 Data selecting unit
15, 27 Output unit
16 Occurrence distribution memory unit 22 Data dividing unit
23 Partial data group storage unit
26 Data aggregation unit
28 Clustering unit
29 Cluster representative extraction unit

CITATION LIST

Patent Literatures

[PL1] JP2007-142883A
[PL2] JP11-167634A
[PL3] JP2008-065803A
[PL4] JP2002-222419A
[PL5] JP2005-260588A
[PL6] JP6-209469A

The invention claimed is:

1. A representative feature extraction system which selects a representative feature from an input data group, the system comprising:
    input means that receives the input data group comprising an input image;
    occurrence distribution memory means that stores an occurrence distribution which is estimated with respect to feature quantities assumed to be input;
    evaluation value calculation means that calculates, with respect to each of data items in the data group, a sum of distances to other data items included in the data group based on the occurrence distribution, to determine an evaluation value for each of the data items, the distance being a value representing a degree of similarity;
    data selecting means that selects the data item having a smallest evaluation value as a representative feature of the data group; and
    a detecting means that detects a partial portion of the input image based on comparison with the representative feature,
    wherein said evaluation value calculation means determines, with respect to a pattern calculated according to the occurrence distribution, the distance between two data items as a value according to a product of a probability of a plurality of data value of a plurality of components of the feature quantities on the pattern existing between the values of the two data items.

2. The representative feature extraction system according to claim 1, wherein a uniform distribution between a maximum and a minimum in the input date group is used as the occurrence distribution of the feature quantities.

3. The representative feature extraction system according to claim 1, wherein a kind of a distribution profile is determined in advance as the occurrence distribution of the feature quantities, and an average and a variance in the input data group are used as values of an average and a variance in the occurrence distribution.

4. The representative feature extraction system according to claim 1, further comprising dividing means that divides the data group into a plurality of partial data groups,
    wherein said evaluation value calculation means calculates, with respect to each of the partial data groups, the evaluation value for each of data items included in the partial data group, and said data selecting means selects a representative feature with respect to each of the partial data groups.

5. The representative feature extraction system according to claim 1, further comprising:
    storage means that stores the data group; and
    output means that outputs the representative feature.

6. The representative feature extraction system according to claim 1, further comprising dividing means that divides the data group into a plurality of partial data groups, wherein said evaluation value calculation means calculates, with respect to each of the partial data groups, the evaluation value for each of data items included in the partial data group, and said data selecting means selects a representative feature with respect to each of the partial data groups.

7. The representative feature extraction system according to claim 6, further comprising:
    storage means that stores the data group; and
    output means that outputs the representative feature.

8. A representative feature extraction method of selecting a representative feature from an input data group, the method comprising:
    receiving the input data group comprising an input image;
    calculating, with respect to each of data items in the data group, a sum of distances to other data items included in the data group based on an occurrence distribution which is estimated with respect to feature quantities assumed to be input, and determining an evaluation value for each of the data items, the distance being a value representing a degree of similarity;
    selecting the data item having a smallest evaluation value as a representative feature of the data group; and
    detecting a partial portion of the input image based on comparison with the representative feature,
    wherein when the evaluation value is determined, the distance between two data items is determined, with respect to a pattern calculated according to the occurrence distribution, as a value according to a product of a probability of a plurality of data value of a plurality of components of the feature quantities on the pattern existing between the values of the two data items.

9. The representative feature extraction method according to claim 8, wherein a uniform distribution between a maximum and a minimum in the input date group is used as the occurrence distribution of the feature quantities.

10. The representative feature extraction method according to claim 8, wherein a kind of a distribution profile is determined in advance as the occurrence distribution of the feature quantities, and an average and a variance in the input data group are used as values of an average and a variance in the occurrence distribution.

11. The representative feature extraction method according to claim 8, further comprising dividing the data group into a plurality of partial data groups,
    wherein with respect to each of the partial data groups, the evaluation value for each of data items included in the partial data group is calculated, and a representative feature is selected with respect to each of the partial data groups.

12. The representative feature extraction method according to claim 8, wherein multidimensional data formed from spectral data from a hyper-spectral camera is provided as the data group.

13. The representative extraction method according to claim 8, wherein the detecting comprises detecting abnormal data based on comparison with the representative feature after extracting the representative feature from the input data.

14. The representative feature extraction method according to claim 8, further comprising dividing the data group into a plurality of partial data groups,
    wherein with respect to each of the partial data groups, the evaluation value for each of data items included in the partial data group is calculated, and a representative feature is selected with respect to each of the partial data groups.

15. A non-transitory computer-readable storage medium storing a program for making a computer to execute:
processing of receiving an input data group comprising an input image;
processing of calculating, with respect to each of data items in the input data group, a sum of distances to other data items included in the data group based on an occurrence distribution which is estimated with respect to feature quantities assumed to be input, and determining an evaluation value for each of the data items, the distance being a value representing a degree of similarity;
processing of selecting the data item having a smallest evaluation value as a representative feature of the data group; and
processing of detecting a partial portion of the input image based on comparison with the representative feature,
wherein in processing of calculating the sum of distances and determining the evaluation value, the distance between two data items is determined, with respect to a pattern calculated according to the occurrence distribution, as a value according to a product of a probability of a plurality of data value of a plurality of components of the feature quantities on the pattern existing between the values of the two data items.

* * * * *